United States Patent
Bol

(10) Patent No.: US 11,819,945 B2
(45) Date of Patent: Nov. 21, 2023

(54) METHOD FOR ADDITIVE MANUFACTURING NACELLE INLET LIPSKINS

(71) Applicant: The Boeing Company, Chicago, IL (US)

(72) Inventor: Eric D. Bol, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 840 days.

(21) Appl. No.: 16/670,278

(22) Filed: Oct. 31, 2019

(65) Prior Publication Data

US 2020/0061748 A1  Feb. 27, 2020

Related U.S. Application Data

(63) Continuation of application No. 15/720,098, filed on Sep. 29, 2017, now Pat. No. 10,507,548.

(51) Int. Cl.
*F02C 7/04* (2006.01)
*B33Y 80/00* (2015.01)
(Continued)

(52) U.S. Cl.
CPC ............ *B23K 26/342* (2015.10); *B22F 10/47* (2021.01); *B23K 26/0006* (2013.01); *B23K 26/0861* (2013.01); *B23K 26/0876* (2013.01); *B23K 26/144* (2015.10); *B23K 26/147* (2013.01); *B33Y 10/00* (2014.12); *B33Y 30/00* (2014.12); *B33Y 80/00* (2014.12); *B64D 33/02* (2013.01); *F02C 7/04* (2013.01);
(Continued)

(58) Field of Classification Search
CPC .............. B23K 26/342; B23K 26/0006; B23K 26/0861; B23K 26/0876; B23K 26/144; B23K 26/147; B23K 2101/006; B23K 2101/045; B23K 2103/10; B23K 2103/14; B23K 2103/16; B23K 2103/42; B33Y 10/00; B33Y 30/00; B33Y 80/00; B64D 33/02; F02C 7/04; F05D 2230/31; Y02T 50/60

See application file for complete search history.

(56) References Cited

U.S. PATENT DOCUMENTS 6,027,326 A     2/2000  Cesarano, III et al.
8,092,169 B2 *  1/2012  Cloft .................... B64D 33/02
                                                        415/220

(Continued)

OTHER PUBLICATIONS

Non-Final Office Action dated Jan. 25, 2019 for U.S. Appl. No. 15/720,098.

(Continued)

*Primary Examiner* — John A Hevey
(74) *Attorney, Agent, or Firm* — Gates & Cooper LLP

(57) ABSTRACT

An apparatus for fabricating a part, comprising a curved shaft; a build plate connected to the curved shaft; a motor; and a transmission connecting the motor and the curved shaft. The build plate moves along a curved path having a radius of curvature originating on an axis when the transmission transfers power from the motor to the curved shaft. Material deposited on the build plate along the curved path forms the part comprising a solid of revolution around the axis. In one or more examples, the part is an aircraft engine inlet.

20 Claims, 12 Drawing Sheets

(51) Int. Cl.

| | | |
|---|---|---|
| *B64D 33/02* | (2006.01) | |
| *B33Y 10/00* | (2015.01) | |
| *B33Y 30/00* | (2015.01) | |
| *B23K 26/342* | (2014.01) | |
| *B23K 26/08* | (2014.01) | |
| *B23K 26/144* | (2014.01) | |
| *B23K 26/14* | (2014.01) | |
| *B23K 26/00* | (2014.01) | |
| *B22F 10/47* | (2021.01) | |
| *B23K 103/10* | (2006.01) | |
| *B23K 103/14* | (2006.01) | |
| *B23K 101/00* | (2006.01) | |
| *B23K 103/16* | (2006.01) | |
| *B23K 101/04* | (2006.01) | |
| *B23K 103/00* | (2006.01) | |

(52) U.S. Cl.
CPC .. *B23K 2101/006* (2018.08); *B23K 2101/045* (2018.08); *B23K 2103/10* (2018.08); *B23K 2103/14* (2018.08); *B23K 2103/16* (2018.08); *B23K 2103/42* (2018.08); *F05D 2230/31* (2013.01)

(56) References Cited

U.S. PATENT DOCUMENTS

| | | |
|---|---|---|
| 8,651,415 B1 | 2/2014 | Sparks |
| 9,403,599 B2 * | 8/2016 | Binks ............... B64D 29/06 |
| 2013/0189435 A1 | 7/2013 | Mackie et al. |
| 2015/0113999 A1 | 4/2015 | Tretow et al. |
| 2015/0260104 A1 | 9/2015 | Wilson et al. |
| 2015/0277146 A1 | 10/2015 | Vazquez et al. |
| 2015/0298393 A1 | 10/2015 | Suarez |
| 2015/0307385 A1 | 10/2015 | Klein et al. |
| 2016/0024963 A1 | 1/2016 | Lumbab et al. |
| 2016/0151977 A1 * | 6/2016 | Burd ............... B29C 64/386 700/98 |
| 2016/0236798 A1 | 8/2016 | Batt et al. |
| 2016/0356180 A1 | 12/2016 | Bol |
| 2017/0165915 A1 | 6/2017 | Deng et al. |
| 2017/0217100 A1 | 8/2017 | Gardiner |
| 2017/0274601 A1 | 9/2017 | Dunne et al. |
| 2017/0297264 A1 | 10/2017 | Linnell et al. |
| 2018/0127108 A1 * | 5/2018 | Lebeda ............... F02C 7/04 |
| 2018/0186575 A1 | 7/2018 | Schoenfelder |
| 2018/0033978 A1 | 11/2018 | Leon et al. |
| 2018/0311739 A1 | 11/2018 | O'Brien |
| 2018/0371995 A1 | 12/2018 | Dorsey et al. |
| 2019/0093557 A1 | 3/2019 | Thomas et al. |

OTHER PUBLICATIONS

Notice of Allowance dated Jul. 25, 2019 for U.S. Appl. No. 15/720,098.

* cited by examiner

METHOD FOR ADDITIVE MANUFACTURING NACELLE INLET LIPSKINS

CROSS REFERENCE TO RELATED APPLICATIONS

This application is a continuation under 35 U.S.C. § 120 of co-pending and commonly-assigned U.S. Utility patent application Ser. No 15/720,098, filed on Sep. 29, 2017, by Eric D. Bol, entitled "METHOD FOR ADDITIVE MANUFACTURING NACELLE INLET LIPSKINS," which application is incorporated by reference herein.

BACKGROUND

1. Field

The present disclosure describes a novel additive manufacturing method and apparatus.

2. Description of the Related Art

Conventional engine nacelle lipskins are fabricated from a single thin aluminum sheet that is either spun formed or super-plastically formed (SPF) into the desired lipskin (mostly circular) shape. Spin forming an engine nacelle lipskin involves setting a donut shaped flat sheet of metal on a mandrel having the shape of the lipskin, spinning the mandrel while heating the flat sheet so as to soften the metal, and using a stylus to apply a force to the surface the sheet so as to slowly form the sheet to the shape of mandrel. SPF forming an engine nacelle lipskin involves placing the donut shaped flat sheet of metal into a heated die so as to soften the metal, and applying pressure to one side of the sheet to stretch the sheet into the shape of the die's surface. Such metal forming processes are imprecise, do not allow fabrication of parts having variable symmetry, and make long draws especially difficult.

However, Computational Fluid Dynamics (CFD) methods can be used to optimize the external airflow surfaces to reduce drag and increase laminar flow of engine inlets. These CFD designs of much larger, complex, and non-symmetric, engine inlet shapes are difficult to form within required tolerances (high smoothness) via traditional methods such as SPF and spin forming. What is needed are methods of fabricating complex external airflow surfaces. The present disclosure satisfies this need.

SUMMARY

Described herein is an apparatus for fabricating a part, comprising a curved shaft; a build plate connected to the curved shaft; a motor; and a transmission connecting the motor and the curved shaft. The build plate moves along a curved path having a radius of curvature originating on an axis when the transmission transfers power from the motor to the curved shaft. Metal particles, ejected from a nozzle in a powder feed machine and melted using a laser beam emitted from a laser, combine to form the material on the build plate. Material deposited on the build plate along the curved path forms the part comprising a solid of revolution around the axis.

In one example, the transmission further comprises gearing and a guide engaging the curved shaft. The gearing, the guide, and a stiffness of the curved shaft provide a rigid support for the build plate moving in increments along the curved path, allowing the material to deposit on the build plate in layers each comprising a cross-sectional profile of the solid of revolution. Examples of layer thickness include, but are not limited to, thicknesses in a range of 1-500 micrometers.

A computer controls motion of the nozzle and the motor so that, between increments, the nozzle follows a pattern tracing the cross-sectional profile of the solid of revolution. The material deposited on the build plate moving along the curved path forms the part having the exact dimensions and curvature defined in a computer generated representation of the part stored in the computer. In one example, the computer controls a flow rate of the material from the nozzle and the motion of the nozzle so that an outermost side of the layer is thicker than an innermost side of the layer.

Various parts may be fabricated using the techniques described herein. In one embodiment, the part is an engine inlet or a section of an engine inlet having a cross-sectional profile including the profile of a lipskin connected to the profile of an outer barrel and a profile of a forward bulkhead. In a further example, the cross-sectional profile further comprises a profile of a stiffener connected to the profile of the outer barrel; a profile of an inner barrel attached to the profile of the forward bulkhead; a profile of an aft bulkhead connected to the profile of the outer barrel; and a profile of an inlet attach flange connected to the profile of the inner barrel. In yet a further example, the cross-sectional profile comprises a joint for connecting with an adjacent cross-sectional profile so as to assemble a completed part.

BRIEF DESCRIPTION OF THE DRAWINGS

Referring now to the drawings in which like reference numbers represent corresponding parts throughout:

FIGS. 1A-1C illustrate a build plate arc machine according to one example at various stages of manufacturing of a part, wherein FIG. 1A illustrates the configuration of the machine at the start of manufacturing (0% complete), FIG. 1B illustrates the configuration of the machine after the part is 33% complete, and FIG. 1C illustrates the configuration of the machine after the part is completely manufactured (100% complete).

FIGS. 3A-3C illustrate an engine inlet fabricated using the method of FIG. 2 and the apparatus of FIGS. 1A-1C, wherein FIG. 3A is a front view showing multiple builds joined together to form a completely round complex metal structure, FIG. 3B is a side view showing the assembled pieces of lipskin completing a body of revolution, and FIG. 3C shows the inlet assembled on an engine nacelle.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description Additive Manufacturing (AM) is a process by which parts are made one thin layer at a time. In a typical embodiment, a powder feed AM process shoots very fine particulate metal powder from a nozzle. The stream of powder passes through a focused laser 252 which rapidly heats and melts the powder as the powder comes in contact with the build surface. Once a single layer of the part has been completed, the nozzle or build plate moves away in one layer (very small) increments and the nozzle then proceeds to deposit the next layer of material 404. Once all layers are complete, the part is finished and removed from the build plate.

Build Plate Arc Machine

Figure 1A:
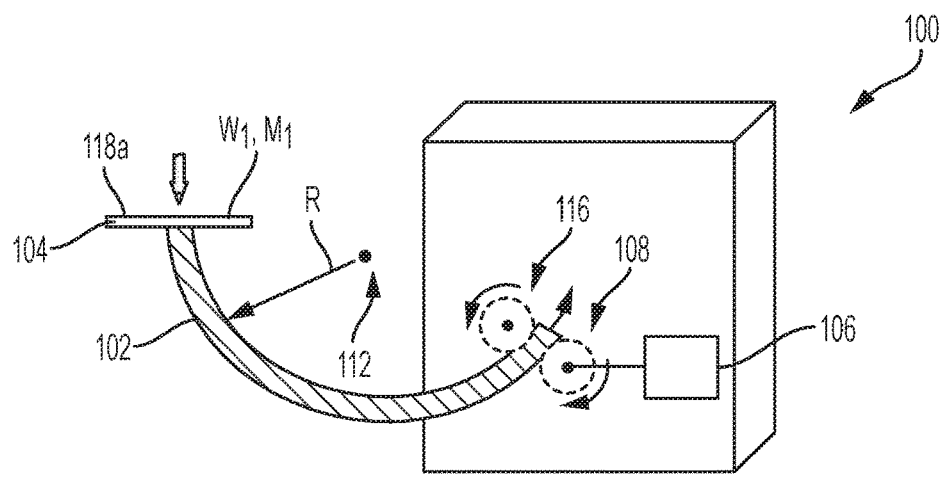
Figure 1B:
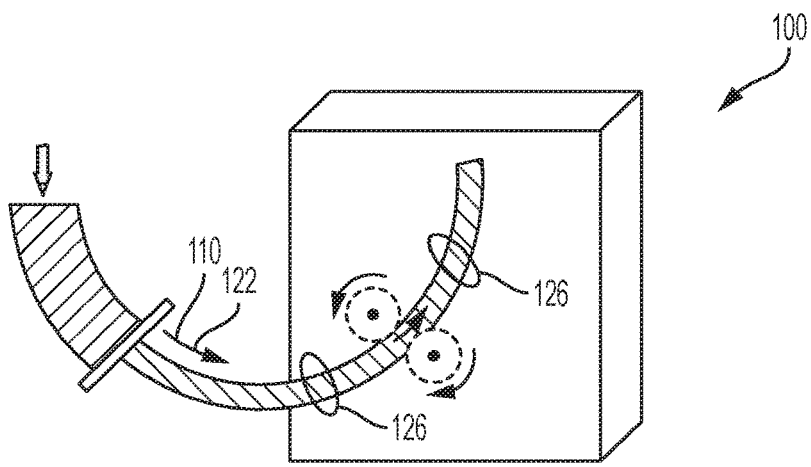
Figure 1C:
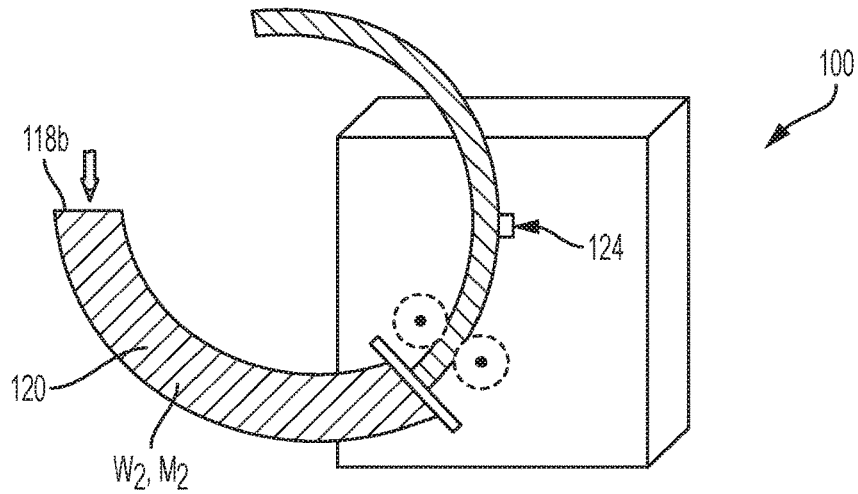
Figure 2:
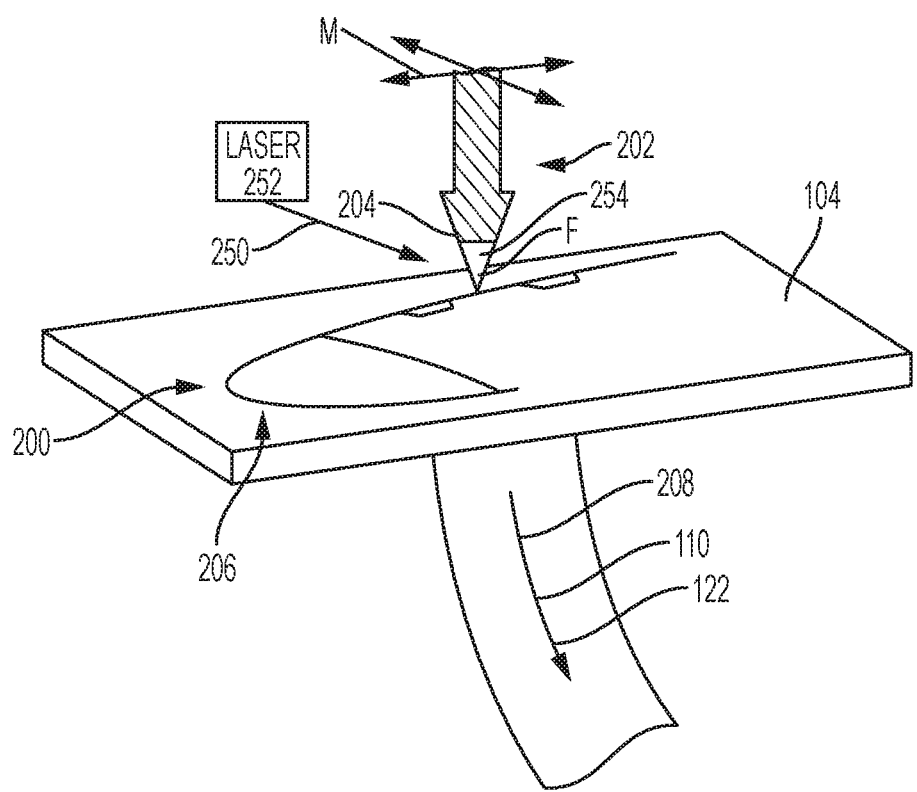
FIG. 2 illustrates a process for building an AM lipskin using the apparatus of FIGS. 1A-1C.

FIGS. 1A-1C illustrate an apparatus 100 for fabricating a part using additive manufacturing, comprising a curved shaft 102; a build plate 104 connected to the curved shaft 102; a motor 106; and a transmission 108 connecting the motor 106 and the curved shaft 102. The apparatus 100 is unique in that instead of moving the build plate 104 in the conventional vertical direction, the apparatus 100 actually moves the build plate 104 in a large arc 110 having the revolution axis 112 co-inciding/about the part's revolution axis. The curved shaft 102 (e.g., guide rail) attached to the bottom 114 of the build plate 104 is moved in very small increments via stiff gears 116 and guides 126. The gears 116 and guides 126 are turned by the motor 106 that is computer 1102 controlled and programmed to function with a powder feed machine (e.g., as illustrated in FIG. 2). The powder feed machine deposits material layer 118a by layer 118b onto the build plate 104 so as to form a part 120. Once a deposited layer 118a, 118b is complete, the powder feed machine 202 sends a signal to the computer 1102 controlling the motor 106 in build plate arc machine 100, so that when the motor 106 rotates, the build plate 104 subsequently moves as directed. Specifically, the build plate 104 moves along the curved path 122 having a radius of curvature R originating on the axis 112 when the transmission 108 transfers power from the motor 106 to the curved shaft 102.

The machine 100 keeps the build plate 104 from deflecting and ruining the part 120 as more and more layers 118a, 118b are deposited on the build plate 104 and the weight on the build plate 104 increases. In one or more examples, external tooling supports 124 keep the part 120 from deflecting while a series of internal guides 126 along the rail path 122 provide additional rigidity to the build plate 104. In one or more further examples, the part weight is less than the weight of the curved shaft 102 or guide rail such that the machine 100 designed to adequately support the weight $W_1$ and moment $M_1$ at the first layer 118a is able to easily rigidly support the weight $W_2$ and moment $M_2$ at the final layer 118b.

Lipskin Fabrication Process

FIG. 2 illustrates the process of building an AM lipskin 300 (as illustrated in FIG. 3) starts with a build plate 104 large enough to contain the entire inlet cross-sectional profile 200. The powder feed machine 202 comprises an AM powder feed nozzle 204, or multiple nozzles 204, located above the build plate 104 and coupled to laser 252. The nozzles 204 move in a designated pattern 206 (controlled by computer 1102) tracing the cross section 200 of the lipskin 300 and depositing a thin layer 118a, 118b of material 404. Once the first layer 118a has been completed, the machine 100 moves the build plate 104 away from the nozzle 204 at one layer 118a thickness T increments. Each movement of the build plate 104 is preceded by another layer 118b being added to the cross section 200 of the lipskin. In this way, the part 120 comprising the lipskin 130 grows from the build plate 104. However, as discussed above, the machine 100 does not move the build plate 104 in the traditional downwards direction. Instead, the machine 100 rotates the build plate 104 in a large arc 208 with the centerline 302 of the nacelle inlet 304 as the axis 112 of revolution.

Different engine inlets 304 may require custom arc 208 paths. With the benefit of AM, not every layer 118a, 118b needs to be identical and special features and shapes can be added at different times throughout the build. In one or more examples, the part 120 is split into any given number of pieces such that the machine 100 moves the build plate 104 to the total extent of the desired arc angle for the part 120.

Figure 3A:
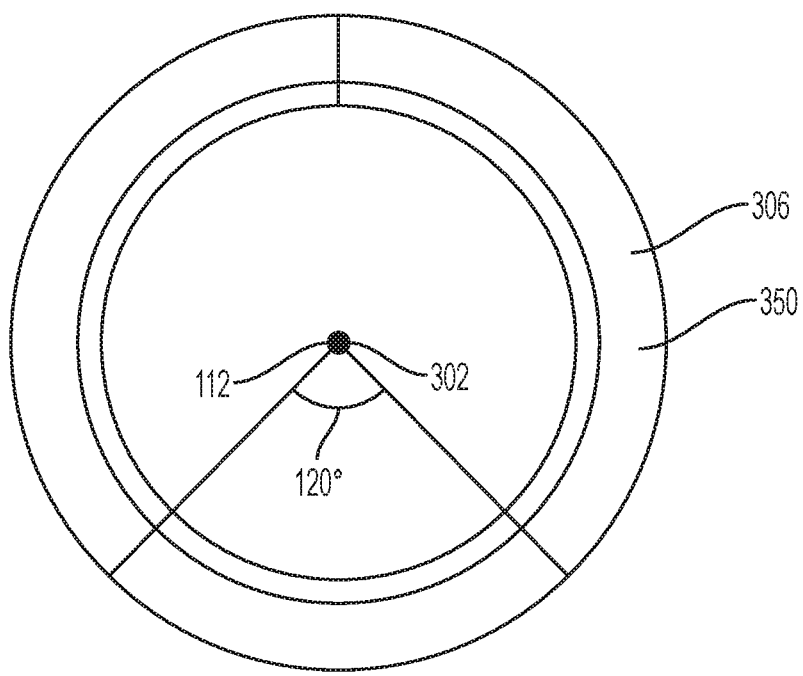
Figure 3B:
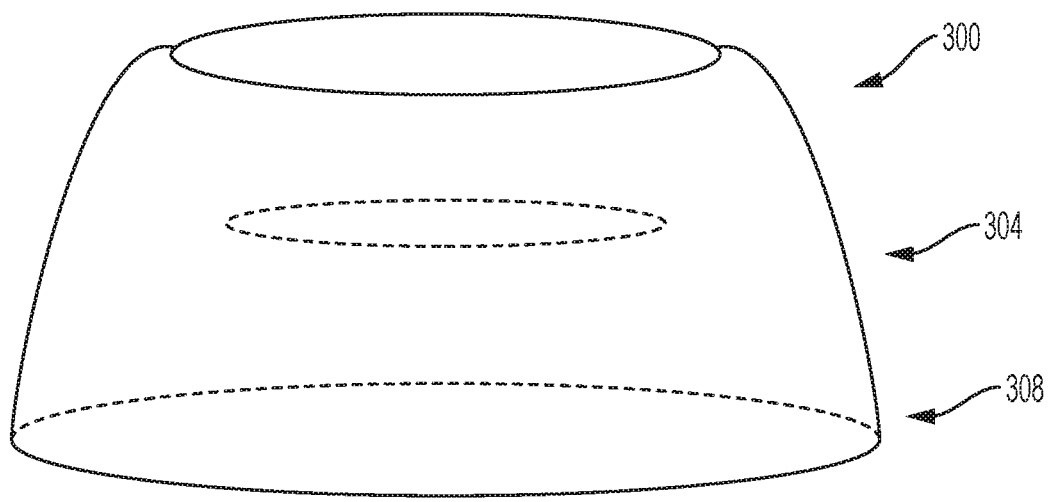
Figure 3C:
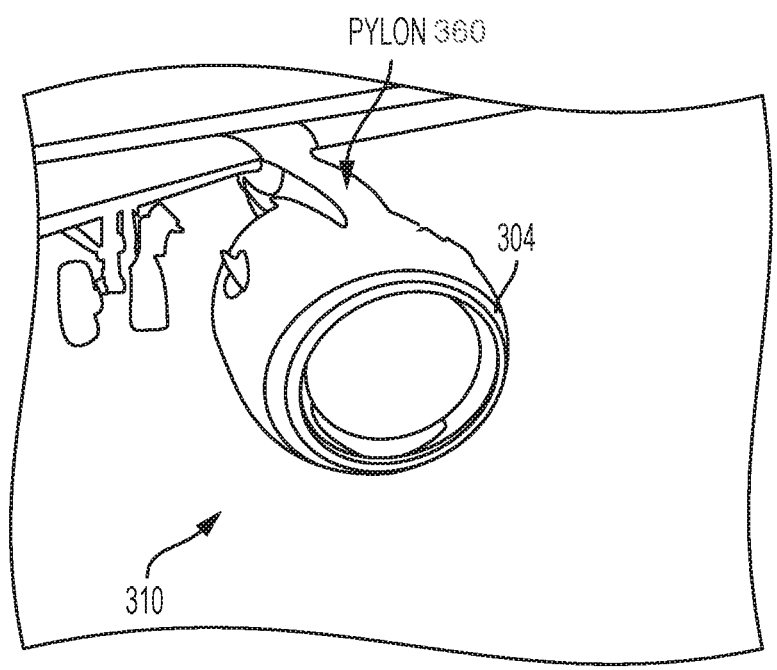

FIG. 3A illustrates an example wherein the inlet 304 is built from three pieces 306 and each piece 306 is fabricated by moving the build plate through a 120 degree arc 208. However, other angles and numbers of pieces. In one or more examples, manufactured inlet lipskin or lipskin part/piece 306 weighs less than the weight of the curved shaft 102 or guide rail so as to minimize unwanted deflection of the curved shaft 102 or guide rail as described above. FIG. 3B is a side view showing the assembled pieces 306 of lipskin completing a body of revolution 308, and FIG. 3C shows the inlet 304 assembled on an engine nacelle 310. Also illustrated is a pylon 360.

Figure 4:
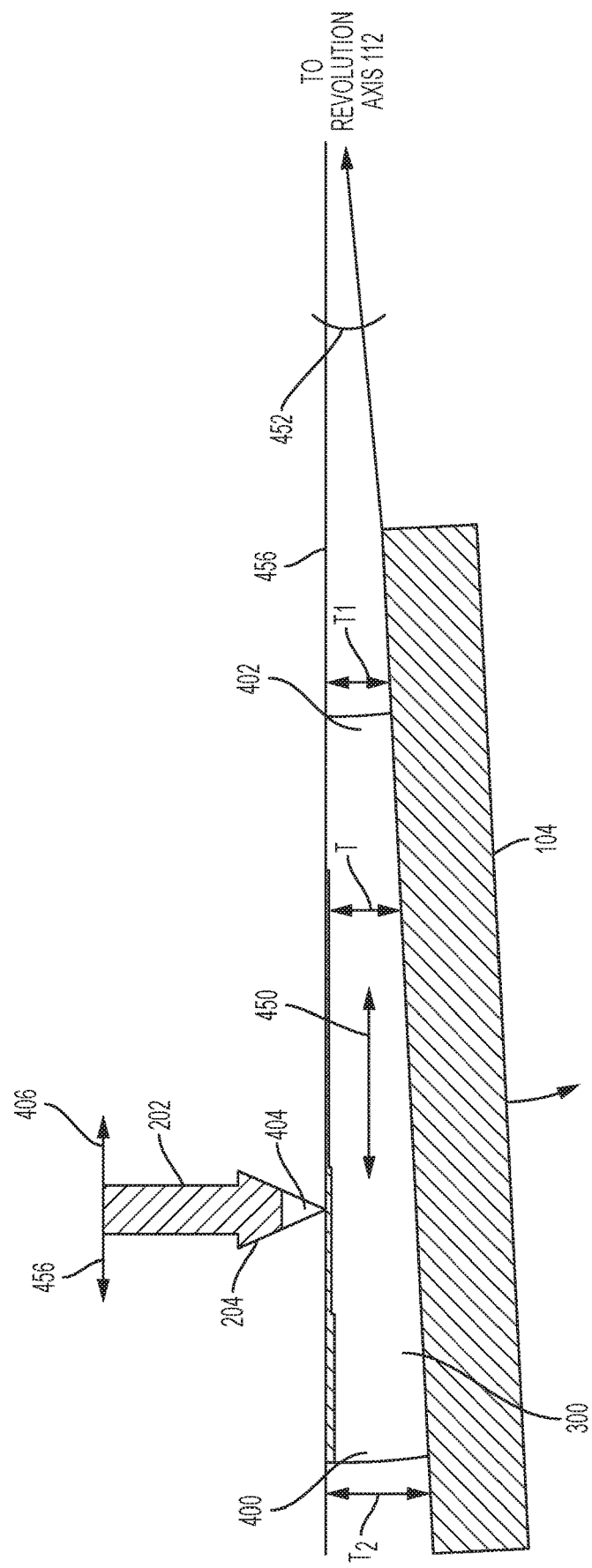
FIG. 4 illustrates layer thickness variation across the build plane, according to one example.

FIG. 4 illustrates an example method for printing an arc segment requiring carefully tailored layer 118a, 118b thicknesses T (conventional methods print uniform layers). Despite the inlet 304 being built from very thin layers/slices 118a, 118b that are nearly the same thickness, FIG. 4 shows the outer most part 400 of the lipskin 300 has to be slightly thicker $T_2$ than the thickness $T_1$ at the innermost part 402, with a constant thickness gradient G across 450 the build plate 104. In one example, the constant gradient is achieved when the flow rate of the material 404 from the nozzle 204 is constant and the nozzle 204 is moved 406 at a slower rate as is transits the build plate 104. In another example, the flow rate of the material 404 from the nozzle 204 is varied as the nozzle 204 moves across the build plate 104, depositing more material at the outermost end 400 and less material 404 at the inner most end 402. The difference in thickness T across the part varies depending on the size of the part 120. In various examples of very large parts 120, the differences in thickness between the thickest end (having thickness $T_2$) of the layer 118a and the thinnest end (having thickness $T_1$) are extremely small. Nevertheless, in some embodiments, thickness differences must be accounted for during part 120 design or the outermost areas 400 of the part 120 will be more porous (less dense) than the inner most areas 402. Some applications need constant density in order to achieve the desired material properties and part quality, etc. FIG. 4 further indicates the angle of rotation 452 (exaggerated for illustration purposes) of the build plate 104 about the revolution axis 112 and the nozzle movement plane 454, and the build plane 456.

Example Lipskin Cross-section

Figure 5:
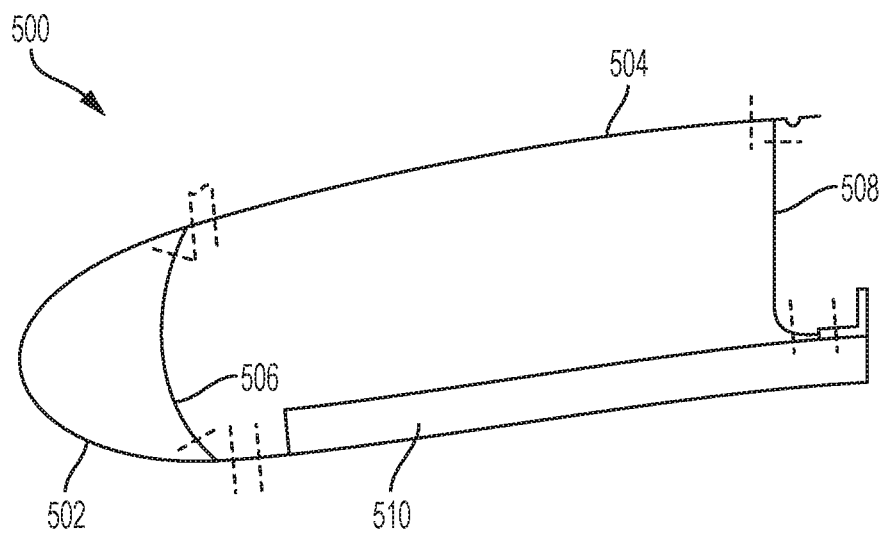
FIG. 5 illustrates a conventional nacelle inlet assembly.

FIG. 5 illustrates a conventional nacelle inlet assembly 500 comprising formed lipskin 502, composite outer barrel 504, forward bulkhead 506, aft bulkhead 508, and acoustically perforated composite inner barrel 510. The pieces are assembled separately.

Using the methods and apparatus described herein, on the other hand, many parts of the inlet assembly can be merged into the lipskin itself to form a single part. Parts such as the outer barrel, stiffeners, bulkheads, and attach flanges can all become a feature of the lipskin via this novel process. Moreover, the additively manufactured (AM) nacelle lipskin does not require a metal forming process. Long lipskin extensions/draws all the way aft to the aft bulkhead attach point are not a challenge for the additive manufacturing processes illustrated herein, unlike for existing methods which struggle with deep draws.

Figure 6:
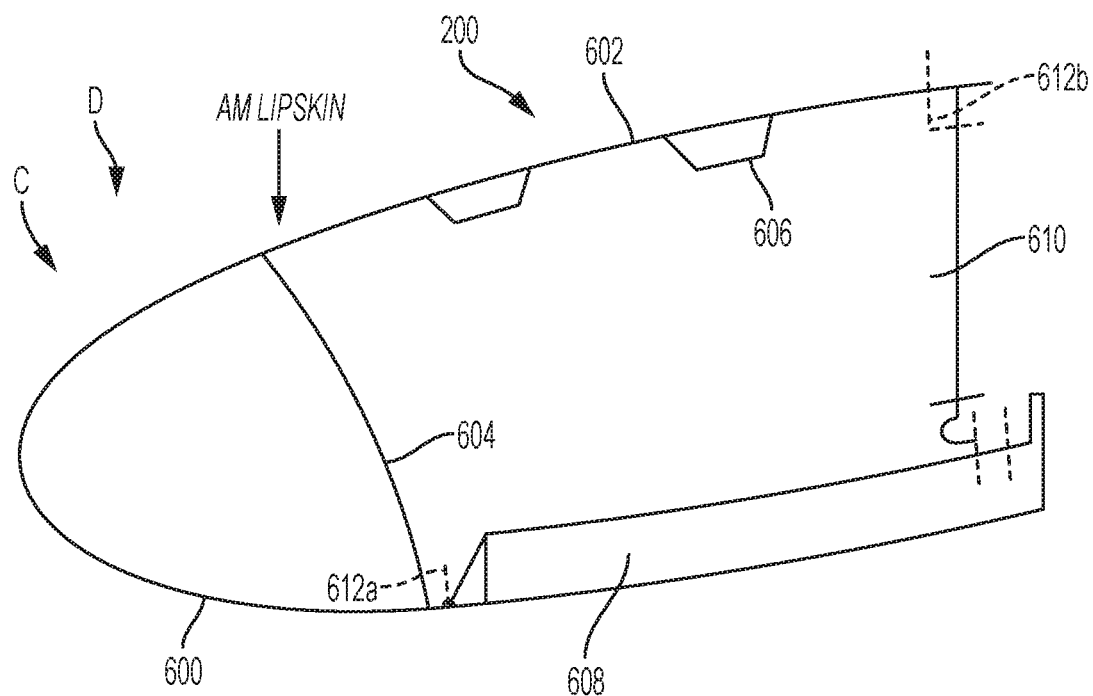
FIG. 6 illustrates the cross-section of a nacelle inlet assembly fabricated using the apparatus of FIGS. 1A-1C and process of FIG. 2.

FIG. 6 illustrates a cross-section 200 of a nacelle inlet assembly fabricated according to the methods described herein. The cross-section 200 includes a profile of a lipskin 600 connected to the profile of an outer barrel 602 and connected to a profile of a forward bulkhead 604. Various other components may also be integrated. FIG. 6 illustrates the cross-section 200 further including a profile of a stiffener 606 connected to the profile of the outer barrel 602; a profile of an acoustically perforated inner barrel 608 attached to the profile of the forward bulkhead 604; a profile of an aft bulkhead 610 connected to the profile of the outer barrel; 602 and a profile of an inlet attach flange 612a, 612b connected to the profile of the inner barrel 608 or outer barrel 602. The inner barrel 608 may comprise a composite sandwich.

Figure 7A:
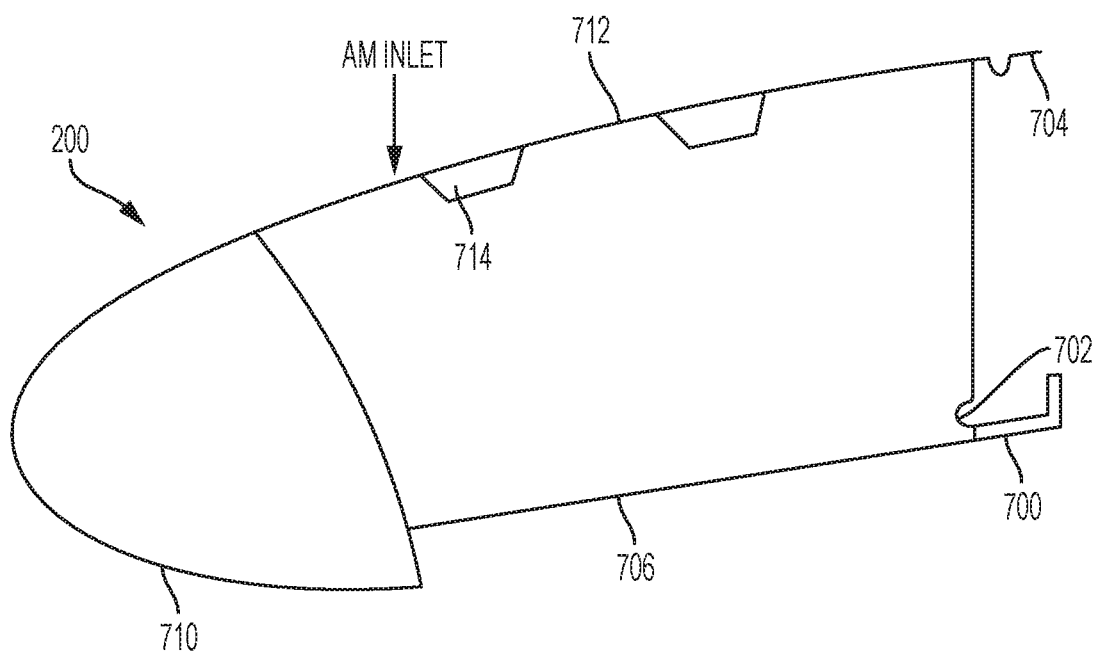
FIG. 7A-7B and FIG. 8A-8B illustrate further examples of printing an entire inlet structure.
Figure 7B:
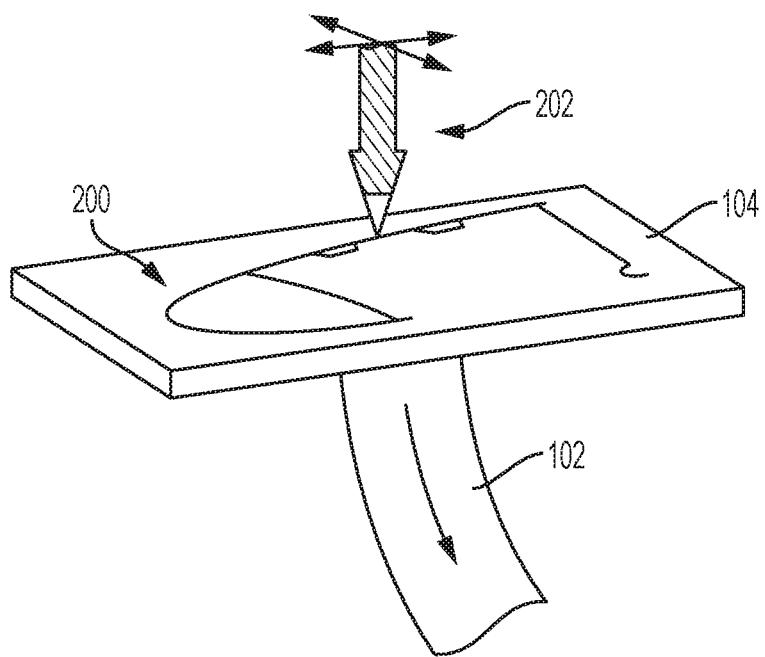

FIG. 7A illustrates a further example of depositing (e.g., printing) an entire inlet structure cross-section, wherein the cross-section 200 includes inlet attach flange 700, inner spring ring 702, T-V chord 704, stiffener 714, and the profile of an inner barrel 706, the profile of the inner barrel 706 including a space for an acoustic treatment insert. The lipskin 710 may include the outer barrel 712. FIG. 7B illustrates how the part of FIG. 7A is integrated and consolidated using the build plate arc machine 100.

Figure 8A:
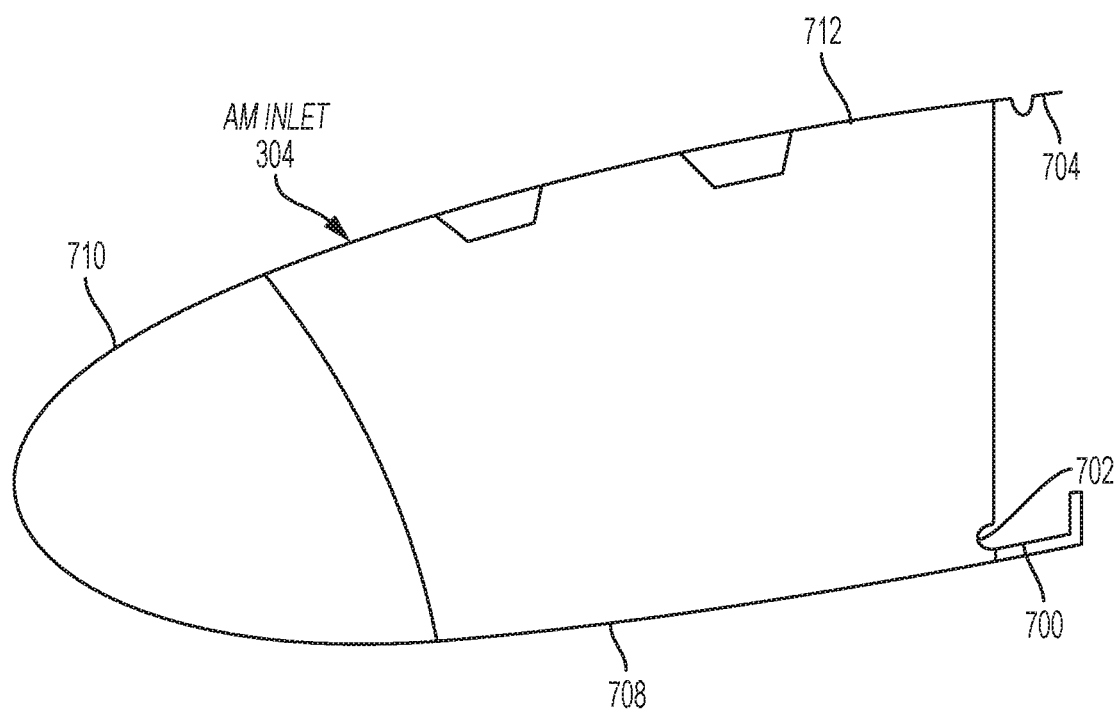
Figure 8B:
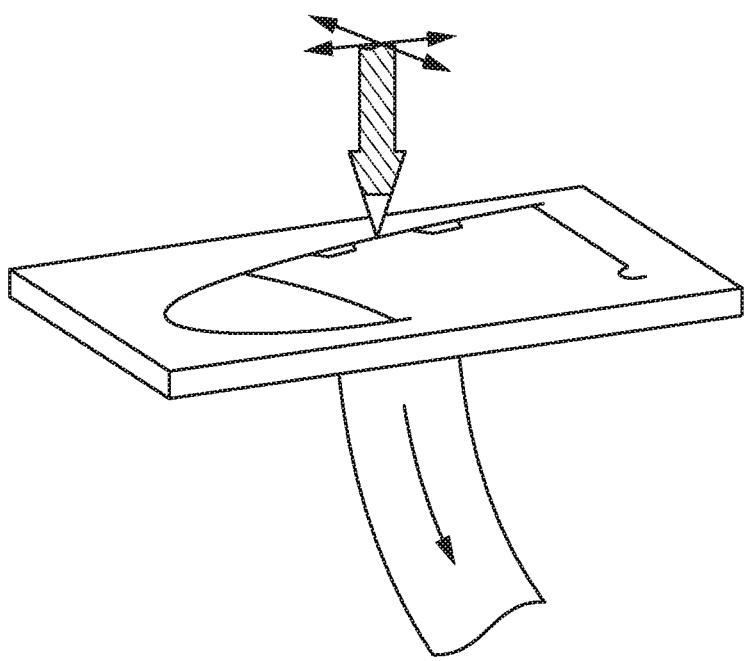

FIG. 8A illustrates a yet further example of depositing (e.g., printing) and entire inlet structure cross section 200, wherein the cross-section 200 includes inlet attach flange 700, inner spring ring 702, T-V chord 704, and a non-acoustically treated inner barrel 708. The lipskin 710 may include the outer barrel 712 FIG. 8B illustrates how the part of FIG. 8A is integrated and consolidated using the build plate arc machine.

Joining the Lipskin

In one or more further examples, the cross-sectional profile 200 further comprises a joint 912 for connecting with an adjacent cross-sectional profile 200.

The methods for joining the lipskin part segments 200 include methods typical for joining sheet metal parts, including, but are not limited to, fastening, welding, or a combination of both fastening and welding at different locations. In one example, the lipskin/outer barrel parts are welded while the forward bulkhead and stiffeners are fastened with printed overlaps or splice plates. In another example, the part's cross-section 200 is designed such that the printer (e.g., machine 100) adds features to the part (near the end or the start of the arc segment build) that facilitate the desired method of joining (either fastening or welding). The various methods are detailed design decisions based on many factors and selected for certain loading conditions, cost, ease of assembly, etc.

Figure 9:
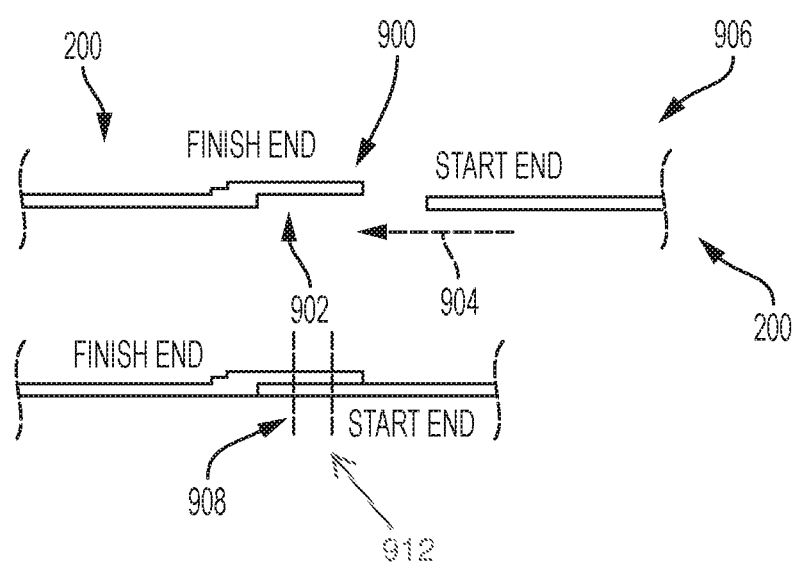
FIG. 9 illustrates an example method for joining the cross-sections fabricated using the processes described herein.

FIG. 9 illustrates an example using a fastened offset overlap. Assuming the part is designed with a lipskin, forward bulkhead, outer barrel, and hat stiffeners, when the profile segment 200 nears completion, the profile 200 shifts slightly to add offset tab features 900 to the end 902 of the profile 200. After the profile segment 200 is removed from the build plate 104, the segment 200 is assembled 904 with the other completed segments 200 using one or more fasteners 908 attaching the tabs 900. The tab features 900 are also inserted at the start side 906 of the next segment 200. The tabs 900 can be placed at various locations, including but not limited to, on the lipskin 600, on the forward bulkhead 604, on the outer barrel 602, and/or on the stiffeners 606.

Example Process Flow

Figure 10A:
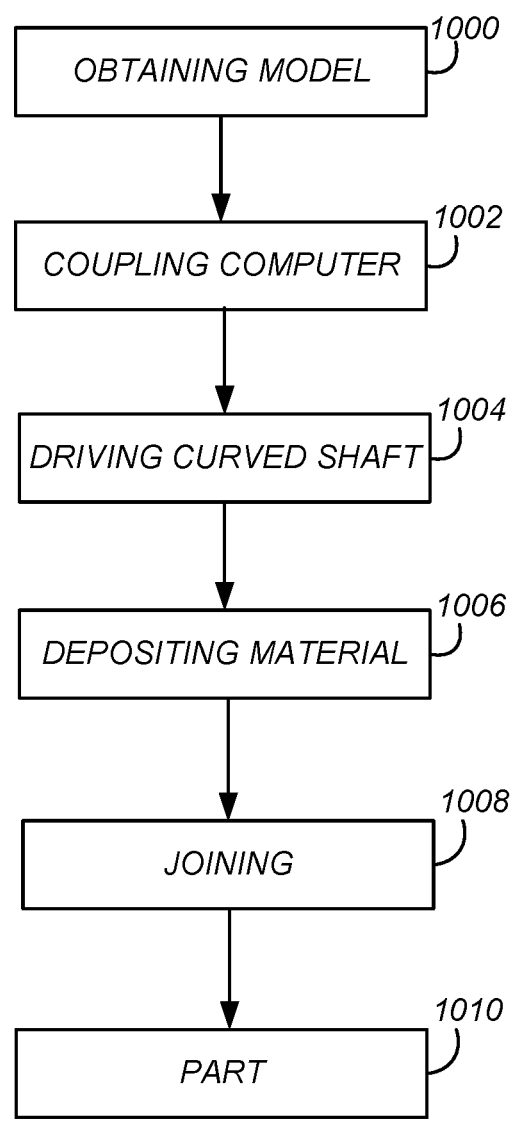
FIG. 10A is an example process flow for fabricating a part using additive manufacturing.

FIG. 10A is an example process flow for fabricating/printing a part using additive manufacturing, cross-section by cross-section.

Block 1000 represents preparing or obtaining a model 3D model of the part to be printed, e.g., a complex inlet lipskin assembly. Computer software on a computer 1102 slices the part into thin layers 118a, 118b (e.g., thin arc segments of nearly uniform thickness). The software also generates machine path code for the nozzle 204 to accurately navigate the 2D plane in which the nozzle 204 deposits the layers 118a, 118b to the precise part profile 200.

Block 1002 represents coupling the computer 1102 to an additive manufacturing apparatus, e.g., as illustrated in FIGS. 1A-1C.

Block 1004 represents driving the curved shaft 102 connected to a build plate 104, so that the build plate 104 moves along a curved path 122 having a radius of curvature R originating on an axis 112. In one embodiment, the driving comprises engaging the curved shaft 102 with a transmission 108 comprising gearing 116 and a guide 126; and transferring power from the motor 106 to the curved shaft 102 using the transmission 108 so that the build plate 104 moves in increments.

Block 1006 represents depositing material on the build plate 104 along the curved path 122, wherein the material forms a part comprising a solid of revolution 308 around the axis 112. Examples of material include, but are not limited to, metal or composite material. Examples of metal include, but are not limited to, aluminum or titanium. Examples of composite material include, but are not limited to, thermoset composites, thermoplastic, and carbon fiber.

In one or more examples, the depositing comprises ejecting metal or other material particles 254 (e.g., but not limited to, aluminum, titanium, thermoplastics, carbon fiber particles) from a nozzle 204 in a powder feed machine 202; and melting the particles 254 using a laser beam 250 emitted from a laser 252, wherein the metal or other composition particles 254 combine to form the material on the build plate 104. The motion M of the nozzle 204 is controlled using a computer 1102 so that, between increments, the nozzle 204 follows a pattern 206 tracing the cross-sectional profile 200 of the solid of revolution 308 and the material deposited on the build plate 104 moving along the curved path 122 forms the part having the exact dimensions D (e.g., within 1%) and curvature C defined in a computer generated representation 1150 of the part stored in the computer 1102. The computer 1102 controls a flow rate F of the metal particles 254 from the nozzle 204 and/or the motion m of the nozzle 204 so that an outermost part/side/end 400 of each layer 118a, 118b is thicker than an innermost end/side/part 402 of each layer 118a, 118b.

In one or more embodiments, the gearing 116, the guide 126, and a stiffness of the curved shaft 102 provide a rigid support for the build plate 104, allowing the material to deposit on the build plate 104 in layers 118a, 118b each comprising a cross-sectional profile 200 of the solid of revolution 308. Each layer 118a, 118b has a thickness, e.g., in a range of 1-500 micrometers.

Block 1008 represents joining the individually manufactured cross-sections. In one method of manufacturing an engine inlet 304, each of three individually manufactured parts comprising 120-degree arcs is assembled via fastening, welding, and/or using a splicing joining plate. In one or more examples, the cross-sectional profile 200 further comprises a joint 912 for connecting with an adjacent cross-sectional profile 200 and the engine inlet 304 comprises a plurality of the solids of revolution 350.

Block 1010 represents the end result, an engine inlet 304, comprising a solid of revolution 308 around an axis 112 of revolution, wherein the solid of revolution 308 comprises a single piece 260 having a cross-section including the cross-sectional profile of a lipskin 600 attached to a cross-sectional profile of a forward bulkhead 604. In one or more examples, the forward bulkhead 604, stiffeners 606, attach angles, and other features are all merged/integrated in the single part, saving weight and assembly costs (traditionally, these components have been separately manufactured and then fastened together).

Other parts could be fabricated, e.g., an engine nozzle.

Traditional forming methods have struggled to achieve the high precision aero smoothness and complex contour demands of CFD designs (e.g., non-axisymmetric nacelle inlets 304). The methods described herein, on the other hand, are able to fabricate axisymmetric and non-axisymmetric inlets 304. In addition, the additive manufacturing process described herein removes the need for forming (e.g., metal forming) steps, and the exterior of the additively manufactured nacelle inlet 304 may, in some examples, simply require a final machine to clean up the flow surface and attachment surfaces. Moreover, as described herein, combining multiple components of the inlet 304 (cross-sections of the lipskin 600, barrels, and bulkheads) into as single cross-section (thereby reducing the quantity of separate parts) and/or removing joins between the bulkhead and the lipskin 600 and between the outer barrel 602 and the aft-bulkhead, decreases the waviness of the inlet and allows the leading-edge of the inlet 304 to experience a more laminar flow and decreased drag. Moreover, the additive manufacturing techniques described herein enable easy addition of super efficient "hat" stiffeners 606 which are conventionally not used due to manufacturing complexity.

Thus, the additive manufacturing techniques described herein enable new architectures and features (more complex aero surfaces) that reduce drag and that previously could not be manufactured or were too costly to manufacture.

Build Plate Arc Machine Fabrication

Figure 10B:
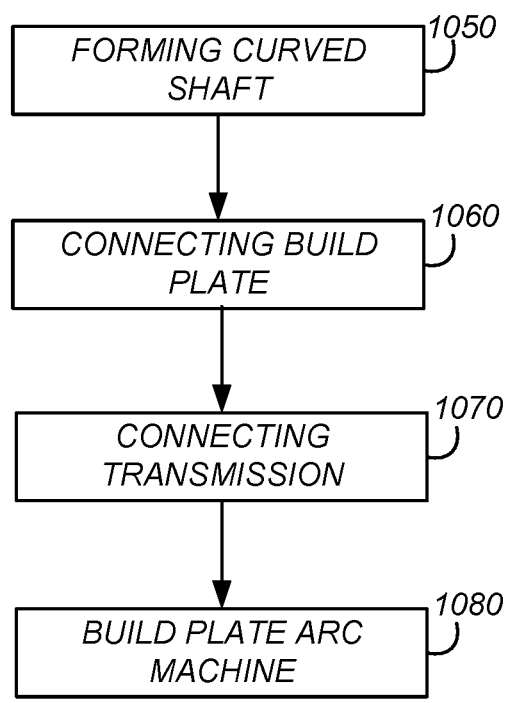
FIG. 10B is an example process flow for fabricating a build plate arc machine according to one or more embodiments.

FIG. 10B is an example process flow for fabricating a build plate arc machine.

Block 1050 represents forming a curved shaft 102. The curved shaft can be a guide rail, for example.

Block 1060 represent connecting a build plate 104 to the curved shaft 102;

Block 1070 represents connecting a transmission between a motor 106 and the curved shaft 102; so that the build plate 104 moves along a curved path 122 having a radius of curvature R originating on an axis 112, when the transmission 108 transfers power from the motor 106 to the curved shaft 102.

Block 1080 represents the end result, a build plate arc machine 100 wherein material 404 deposited on the build plate 104 along the curved path 122 forms a part 120 comprising a solid of revolution 308 around the axis 112. In one or more examples, the curved shaft 102, the transmission 108, and the build plate comprise metal selected from steel, aluminum and titanium.

Processing Environment

Figure 11:
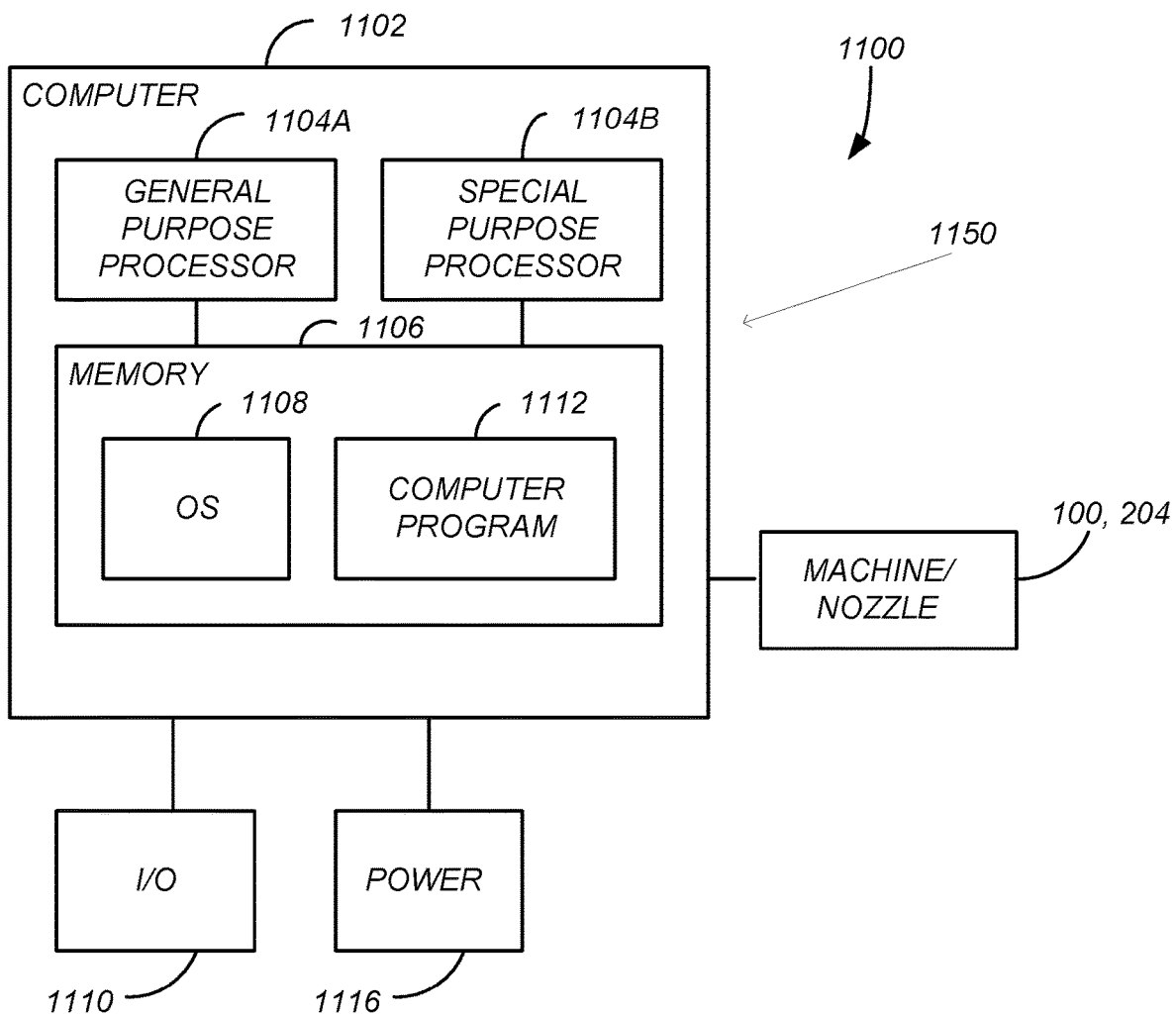
FIG. 11 is an example computer hardware environment for controlling the manufacturing processes described herein.

FIG. 11 illustrates an exemplary system 1100 used to implement processing elements needed to control the nozzle 204 and machine 100.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of controlling the nozzle 204 and/or machine so as to fabricate parts according to the methods described herein. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An engine inlet, composing:
   an additively manufactured part comprising arc segments comprising a plurality of layers deposited by additive manufacturing one on top of another, each of the layers having an inlet cross-sectional profile including a cross-sectional profile of a lipskin and a cross-sectional profile of a forward bulkhead, wherein the layers comprise an edge comprising an arc.

2. The engine inlet of claim 1, wherein the arc comprises a radius of curvature R originating on an axis, and an outermost end of each of the layers furthest from the axis is thicker than an innermost end of each of the layers closest to the axis.

3. The engine inlet of claim 1, further comprising a plurality of the additively manufactured parts joined together.

4. The engine inlet of claim 3, wherein the parts comprise a first part and a second part, the engine inlet further comprising a joint joining the first part to the second part, the joint comprising a first end of one of the layers in the first part overlapping with a second end of another of the layers in the second part.

5. The engine inlet of claim 3, wherein:
the parts include a first part and a second part,
the layers in the first part include a first layer and the layers in the second part comprise a second layer,
the first layer comprises a first tab,
the second layer comprises a second tab, and
the first tab overlaps the second tab.

6. The engine inlet of claim 5, further comprising a fastener attaching the first tab to the second tab.

7. An aircraft including the engine inlet of claim 5, wherein the layers comprise melted metal particles.

8. The engine inlet of claim 1 further comprising:
the additively manufactured part having the edge including the arc, the additively manufactured part comprising an entire cross-section of the engine inlet, the part manufactured using a process comprising:
driving a curved shaft connected to a build plate, the build plate moving along a curved path having a radius of curvature R originating on the axis; and
depositing the layers comprising material on the build plate along the curved path, wherein the material forms the additively manufactured part comprising the edge including the arc having a center coinciding with the axis.

9. The engine inlet of claim 1, wherein the layers include a tab for joining to an additional part.

10. The engine inlet of claim 1, wherein the layers comprise melted metal particles.

11. An engine inlet comprising:
a plurality of parts each comprising a plurality of layers deposited by additive manufacturing one on top of another, each of the layers having an inlet cross-sectional profile including a cross-sectional profile of a lipskin and a cross-sectional profile of a forward bulkhead, wherein the parts are joined together.

12. The engine inlet of claim 11, wherein each of the layers include a cross-sectional profile of an outer barrel connected to the cross-sectional profile of the lipskin.

13. The engine inlet of claim 12, wherein one or more of the layers further comprise:
a cross-sectional profile of a stiffener connected to the cross-sectional profile of the outer barrel;
a cross-sectional profile of an inner barrel attached to the cross-sectional profile of the forward bulkhead;
a cross-sectional profile of the inner barrel connected to the cross-sectional profile of the outer barrel; and
a cross-sectional profile of an inlet attach flange connected to the cross-sectional profile of the inner barrel.

14. The engine inlet of claim 11, wherein the layers each comprise a thickness of 1-500 micrometers.

15. The engine inlet of claim 11, wherein one or more of the plurality of the layers comprise an end including an overlap for joining one of the parts to another one of the parts.

16. The engine inlet of claim 11, wherein the one or more layers comprise a tab for attaching to an additional part.

17. The engine inlet of claim 11, wherein the parts each comprise an edge comprising an arc having a radius of curvature originating on an axis, wherein an outermost end of each of the layers furthest from the axis is thicker than an innermost end of each of the layers closest to the axis.

18. A part, comprising:
an engine inlet comprising a plurality of sections, each of the plurality of the sections comprising a single additively manufactured piece having an inlet cross-sectional profile including a cross-sectional profile of a lipskin connected to a cross-sectional profile of a forward bulkhead.

19. The part of claim 18, wherein each of the sections includes a tab overlapping with the tab in an adjacent one of the sections so as to join the sections.

20. The engine inlet of claim 11, wherein the parts comprise a first part and a second part, the engine inlet further comprising a joint joining the first part to the second part, the joint comprising a first end of one of the layers in the first part overlapping with a second end of another of the layers in the second part.

* * * * *